United States Patent [19]

Crandall et al.

[11] Patent Number: 5,424,122
[45] Date of Patent: * Jun. 13, 1995

[54] NONIONIC, PH-NEUTRAL PRESSURE SENSITIVE ADHESIVE

[75] Inventors: Michael D. Crandall, Woodbury; Robert L. Nelson, Bloomington, both of Minn.

[73] Assignee: Minnesota Mining and Manufacturing Company, St. Paul, Minn.

[*] Notice: The portion of the term of this patent subsequent to Aug. 3, 2010 has been disclaimed.

[21] Appl. No.: 804,296

[22] Filed: Dec. 9, 1991

[51] Int. Cl.⁶ .............................. B32B 27/00
[52] U.S. Cl. ...................... 428/355; 524/57; 524/110; 524/291; 524/317; 524/366; 524/375; 524/378; 524/457; 524/505; 524/548; 524/555; 524/560; 524/561; 524/732; 524/753; 524/755; 524/757; 524/758; 524/759; 524/761; 524/808; 524/831
[58] Field of Search ............... 524/548, 553, 808, 831, 524/375, 378, 505, 57, 366, 457, 560, 561, 110, 291, 317, 732, 753, 757, 755, 758, 759, 761; 428/355

[56] References Cited

U.S. PATENT DOCUMENTS

| | | | |
|---|---|---|---|
| Re. 24,906 | 12/1960 | Ulrich | 206/59 |
| 3,728,148 | 4/1973 | Pietsch et al. | 117/93.31 |
| 4,310,509 | 1/1982 | Berglund et al. | 424/28 |
| 4,329,384 | 5/1982 | Vesley et al. | 428/40 |
| 4,330,590 | 5/1982 | Vesley | 428/336 |
| 4,565,783 | 1/1986 | Hansen et al. | 435/299 |
| 4,590,238 | 5/1986 | Furomoto et al. | 524/831 X |
| 4,785,065 | 11/1988 | Uhl et al. | 524/548 X |
| 4,898,909 | 2/1990 | Vietmeier et al. | 524/831 X |
| 4,923,921 | 5/1990 | Chevalier et al. | 524/556 |
| 4,925,908 | 5/1990 | Bernard et al. | 524/831 X |
| 4,985,488 | 1/1991 | Landin | 524/555 |
| 5,008,329 | 4/1991 | Abe et al. | 524/831 X |
| 5,070,136 | 12/1991 | Dersch et al. | 524/555 |
| 5,071,902 | 12/1991 | Langerbeins et al. | 524/831 X |
| 5,115,064 | 5/1992 | Jung et al. | 524/555 X |
| 5,124,393 | 6/1992 | Ingle et al. | 524/555 X |
| 5,134,186 | 7/1992 | Ingle et al. | 524/555 X |
| 5,232,838 | 8/1993 | Nelson et al. | 435/30 |

FOREIGN PATENT DOCUMENTS

| | | | |
|---|---|---|---|
| 0120265 | 10/1984 | European Pat. Off. | C08F 220/12 |
| 0130080 | 1/1985 | European Pat. Off. | C09J 3/14 |
| 3344354 | 6/1985 | Germany | C08F 220/18 |
| 58-198349 | 11/1983 | Japan | A61L 15/06 |

OTHER PUBLICATIONS

D. Satas, *Handbook of Pressure Sensitive Adhesive Technology*, Van Nostrand Reinhold, N.Y., 1989, Chapter 15 (p. 437).

*Primary Examiner*—Judy M. Reddick
*Attorney, Agent, or Firm*—Gary L. Griswold; Walter N. Kirn; Janice L. Dowdall

[57] ABSTRACT

The invention relates to a neutral nonionic latex comprising:
(a) about 5 to about 70 weight percent of a nonionic polymer comprising polymerized free-radically polymerizable nonionic monomer, based upon the total weight of the neutral nonionic latex, wherein the free radically polymerizable nonionic monomer comprises:
  (i) about 90 to about 99 percent by weight of nonionic alkyl acrylate monomer; and
  (ii) about 1 to about 10 percent by weight of nonionic amide monomer; wherein the weight percentages of (i) and (ii) are based upon the total weight of (i) plus (ii);
(b) about 30 to about 95 weight percent of an aqueous phase, based upon the total weight of the neutral nonionic latex; and
(c) about 2 to about 10 weight percent of a nonionic emulsifier based upon the total weight of the nonionic polymer plus the nonionic emulsifier;
wherein particles of the nonionic polymer are stabilized by the nonionic emulsifier and dispersed within the aqueous phase. The invention also relates to the neutral nonionic adhesive prepared from the latex and to adhesive coated sheet materials.

15 Claims, No Drawings

NONIONIC, PH-NEUTRAL PRESSURE SENSITIVE ADHESIVE

FIELD OF THE INVENTION

This invention relates to normally tacky water-based pressure sensitive adhesive (PSA), prepared by an emulsion polymerization process, that is nonionic in nature and neither acidic nor basic in final form.

BACKGROUND OF THE INVENTION

Acrylate pressure-sensitive adhesives are well-known in the art. Ulrich (U.S. Reissue No. 24,906) describes alkyl acrylate copolymers which comprise a major portion amount of $C_4$ to $C_{14}$ alkyl esters of acrylic acid monomers and a minor portion of a copolymerizable polar monomer such as acrylic acid. Such adhesives are widely popular due to their availability, their low cost and their ability to provide the requisite fourfold balance of adhesion, cohesion, stretchiness, and elasticity known to be required for effective pressure-sensitive adhesives.

Those skilled in the art have developed acrylate pressure-sensitive adhesives whose properties are tailored in one way or another to meet the demands of specific applications. D. Satas, in *Handbook of Pressure Sensitive Adhesive Technology*, Van Nostrand Reinhold, New York, 1989, Chapter 15, provides an overview of acrylate pressure sensitive adhesives and their historical development. It is evident that practitioners in the art have employed a wide variety of combinations of acrylic monomers in their search for adhesives having specified properties.

We have identified a need for an acrylate latex pressure sensitive adhesive composition which is completely pH-neutral and which does not contain ionic species of any kind, specifically for the purpose of allowing, within the adhesive matrix, the growth of microorganisms. Typically, emulsion polymerization techniques will employ an anionic emulsifier, or a mixture of anionic and nonionic emulsifiers (*Handbook of Pressure Sensitive Adhesive Technology*, p. 437), which, in either case, contributes some ionic character to the resulting adhesive.

U.S. Pat. No. 4,565,783, assigned to the assignee of the present case, describes Petrifilm TM microorganism assay plates. The liquid inoculum is contained via a foam dam. These plates, although very useful require a degree of care to assemble because of the need for the foam dam. These plates are built up via several layers, increasing the cost of the plate. The adhesive comprises an acrylic adhesive prepared via solution polymerization.

U.S. Pat. No. 4,310,509 (Berglund et al.), assigned to the assignee of the present case, discloses, but does not claim, a solution-polymerized 2-ethylhexyl acrylate/N-vinyl pyrrolidone adhesive that is suspended with an aqueous solution of a broad-spectrum antibiotic prior to use. This patent does not teach an adhesive which is made as an emulsion polymer, after which any additives (such as selective inhibitors, growth promoters, fillers, etc.) are solubilized in the aqueous emulsion and the mixture is coated onto the film backing.

U.S. Pat. No. 3,728,148 discloses a solution-polymerized pressure-sensitive adhesive tape in which the adhesive is free of reactive groups, in order to prevent corrosion of materials on which the tape is applied.

EP 130080, assigned to Johnson and Johnson, describes an aqueous emulsion polymerization of alkyl acrylates, especially butyl acrylate, 2-ethylhexyl acrylate or mixtures thereof, and N-vinylcaprolactam to produce a PSA for surgical products. The preferred emulsifier is anionic, i.e., sodium dihexylsulfosuccinate. A water-soluble persulfate (ionic) initiator is preferred. The monomer N-vinyl pyrrolidone is specifically excluded from use in these PSAs.

JP 58198349 (Sekisui) describes a PSA for therapeutic tapes or sheets which contains no active chemical groups. The adhesive is a mixture of a methacrylic acid ester polymer and an acrylic acid ester polymer, with the proviso that at least one polymer must contain an amide linkage. The reference mentions only "diacetone acrylamide" as the amide monomer. These polymers are made in organic solution, not via emulsion polymerization.

The prior art has thus not provided a totally neutral nonionic pressure sensitive adhesive via an emulsion polymerization process which would be suitable for culture media growth, for application as skin adhesives, for drug delivery, or for the mounting of photographs.

To our knowledge, a latex acrylate adhesive which is pH-neutral, contains no acidic, basic, or reactive moieties and is made exclusively using a nonionic emulsifier has not been previously described. We have discovered such an adhesive and a method for producing it.

U.S. Pat. No. 5,232,838, Nelson et al., assigned to the assignee of the present case, discloses the use of the adhesive of the invention with a microbiological assay device. Since the adhesive is acid/base neutral it allows growth of the species being assayed while exhibiting sufficient adhesive strength to hold agar and other nutrients as well as the liquid inoculum.

BRIEF DESCRIPTION OF THE INVENTION

The present invention relates to a novel water-borne PSA coating system comprising a polymer latex prepared by the emulsion polymerization of certain specific nonionic monomers. The polymers are prepared via an aqueous emulsion polymerization of monomer systems comprising these specific nonionic monomers. The polymerization process is an entirely solvent-free process. The polymer latex thus formed can be diluted, if necessary, with water in order to obtain the desired polymer concentration and coated onto a substrate without the use of any organic solvent. The PSAs thus obtained possess good peel adhesion and shear strength properties for a variety of substrates.

A first aspect of the present invention relates to a neutral nonionic latex comprising:
  (a) about 5 to about 70 weight percent of a nonionic polymer comprising polymerized free-radically polymerizable nonionic monomer, based upon the total weight of the neutral nonionic latex, wherein the free radically polymerizable nonionic monomer comprises:
    (i) about 90 to about 99 percent by weight of nonionic alkyl acrylate monomer; and
    (ii) about 1 to about 10 percent by weight of nonionic amide monomer; wherein the weight percentages of (i) and (ii) are based upon the total weight of (i) plus (ii);
  (b) about 30 to about 95 weight percent of an aqueous phase, based upon the total weight of the neutral nonionic latex; and (c) about 2 to about 10 weight percent of a nonionic emulsifier based upon the total weight of the nonionic polymer plus the nonionic emulsifier;

wherein particles of the nonionic polymer are stabilized by the nonionic emulsifier and dispersed within the aqueous phase.

Yet another aspect of the invention relates to a coated sheet material comprising a flexible sheet and a PSA coating covering at least a portion (i.e., typically at least about 5%) of one major surface of the flexible sheet wherein the PSA is formed by coating the above described latex, which has been diluted if necessary, onto the flexible sheet and allowing the coating to dry. The coating thus obtained possesses good shear strength and peel adhesion properties.

The term "neutral" as used herein refers to a material having a pH in the range of from about 5 to about 9. For some applications of the PSA of the invention it is preferred that the pH range from about 6 to about 8.

The term "nonionic" as used herein refers to a material lacking the ability to dissociate in aqueous media into positively and negatively charged species.

DETAILED DESCRIPTION OF THE INVENTION

As indicated above, the neutral nonionic latex of the invention comprises a nonionic polymer dispersed within an aqueous phase which is stabilized by a nonionic emulsifier. The latex is formed by the emulsion polymerization of certain nonionic monomers.

Nonionic Monomers

Useful nonionic alkyl acrylate monomers according to the invention include but are not limited to those selected from the group consisting of lower alkyl (i.e. about $C_2$ to about $C_{10}$) esters of acrylic acid, and mixtures thereof. Examples of useful alkyl acrylate monomers include, but are not limited to, the following: isooctyl acrylate (IOA), 2-ethylhexyl acrylate, butyl acrylate, ethyl acrylate, isoamyl acrylate, and mixtures thereof. Isooctyl acrylate (IOA) is the preferred alkyl acrylate monomer.

Useful nonionic amide monomers according to the invention include but are not limited to those selected from the group consisting of acrylamide (ACM), methacrylamide (MACM), N-vinylpyrrolidone (NVP), N-vinylcaprolactam (NVCL), N-vinyl-2-piperidinone, N-(mono- or di-lower alkyl ($C_1$ to $C_5$)) (meth)acrylamides, N-methyl (meth)acrylamide, N,N-dimethyl (meth)acrylamides, and mixtures thereof. Preferred amide monomers include those selected from the group consisting of acrylamide, N-vinyl pyrrolidone, and mixtures thereof.

Preferably, the free radically polymerizable monomer charge comprises about 95 to about 98 percent by weight alkyl acrylate monomer and about 5 to about 2 percent by weight amide monomer based upon the total weight of the monomer charge, for reasons of obtaining good adhesive characteristics, namely peel adhesion and shear strength. The polymer formed from the monomer preferably comprises about 20 to about 60, most preferably about 30 to about 50 weight percent based upon the total weight of the latex.

Oleophilic Nonionic Initiator

A nonionic initiator is one which does not produce an ionic end group on the polymer chain prepared therefrom. An example of such an initiator is benzoyl peroxide which produces a benzyl end group on the polymer chain prepared therefrom. An ionic species such as potassium persulfate produces a negatively charged sulfate end group on the polymer chain prepared therefrom.

Useful oleophilic nonionic, free radical, dissociative initiators for use in the emulsion polymerization include but are not limited to aromatic diazoamino compounds, aromatic diazothio ethers, and organic peroxides such as benzoyl peroxide, lauroyl peroxide, and the like; and azo initiators such as 2-(carbomoylazo)-isobutyronitrile available from Wako Chemicals under the trade designation V-30, and AIBN (azobisisobutyronitrile) available from DuPont. The preferred initiator is lauroyl peroxide for reasons of commercial availability. The preferred amount of initiator is about 0.02 to 0.3 percent by weight, preferably about 0.05 to about 0.25 percent by weight, and most preferably about 0.07 to about 0.2 percent by weight, based on the total weight of the free radically polymerizable monomer charge.

Nonionic Emulsifier

Nonionic emulsifiers fall into a number of chemical classes, all of which derive from the reaction of ethylene oxide with active hydrogen compounds such as phenols, alcohols, carboxylic acids, amines, amides, etc. The terms "surfactant" and "emulsifier" are used interchangeably herein. In theory, any nonionic emulsifier having an HLB ranging from about 8 to about 24 should work, according to the present invention.

Preferred nonionic emulsifiers have HLBs ranging from about 10 to about 20, most preferably about 12 to about 18. If an emulsifier having an HLB of less than about 8 is used, a water-in-oil emulsion will be obtained rather than an oil-in-water emulsion. The latex of the invention cannot be prepared from such a water-in-oil emulsion. If an emulsifier having an HLB greater than about 24 is used the emulsion formed therefrom will experience stability problems. The HLB of an emulsifier is an expression of its Hydrophile-Lipophile Balance, i.e., the balance of the size and strength of the hydrophilic (water-loving or polar) and the lipophilic (oil-loving or non-polar) groups of the emulsifiers. Among the nonionic emulsifiers suitable for use in the present invention are polyethers, e.g., ethylene oxide and propylene oxide condensates in general, which include straight- and branched $C_2$ to $C_{18}$ alkyl, alkylaryl and alkenyl alcohol based copolymers of ethylene oxide and propylene oxide such as the Tergitol® X series of emulsifiers from Union Carbide Co., and block copolymers of ethylene oxide and propylene oxide such as Pluronic® and Tetronic® emulsifiers from BASF Co. Other suitable non-ionic emulsifiers are the "Tweens and Spans" which are the trademarked compositions of ICI, Inc., denoting polyoxyalkylene derivatives of sorbitan and fatty acid esters. Examples of specific nonionic emulsifiers include but are not limited to the following: ethoxylated fatty alcohols, ethoxylated alkylphenols, ethoxylated fatty acids, ethoxylated fatty esters, sorbitan derivatives, sucrose esters and derivatives, ethylene oxide-propylene oxide block copolymers, fluorinated alkyl polyoxyethylene ethanols, and mixtures thereof. Another example of a useful nonionic emulsifier is IGEPAL CA-897, available from RHÔNE-POULENC which is an octyl phenoxy poly(ethylene oxide) ethanol. The nonionic emulsifier is used at about 2 to about 10 weight percent, preferably about 3 to about 5 percent, and most preferably about 4 percent based upon the total weight of the free radically polymerizable monomers, emulsifier, and initiator.

Crosslinking Agents

The adhesive composition of the invention may also contain a neutral nonionic crosslinking agent, preferably a diacrylate crosslinking agent. The terms "crosslinking agent" and "crosslinker" are used interchangeably herein. A crosslinking agent can be added to the free-radically polymerizable monomer/initiator solution prior to polymerization in order to provide an adhesive with a reduced adhesion level. Various types of crosslinking agents are useful in the practice of the invention. Typically, the crosslinker is selected from the group consisting of multifunctional acrylates, triazines, silane coupling agents, benzophenones, derivatives thereof, and mixtures thereof. Examples of useful multifunctional acrylates include but are not limited to di(meth)acrylates. The substituted triazines, include those disclosed in U.S. Pat. Nos. 4,329,384 and 4,330,590 (Vesley), both incorporated herein by reference, e.g., 2,4-bis(trichloromethyl)-6-p-methoxystyrene-s-triazine. Silane coupling agents are also useful in crosslinking. Useful silane coupling agents are epoxy type crosslinkers such as gamma-glycidoxypropyl trimethoxysilane, methacryl types such as gamma-methacryloxypropyltrimethoxysilane, and mercapto types such as gamma-mercaptopropyltrimethoxy silane. An example of a useful benzophenone crosslinking agent is 4-acryloyloxy benzophenone. The most preferred crosslinker is 1,6-hexanediol diacrylate (HDDA). Crosslinkers are preferably used for applications in which a higher shear strength is desired.

Crosslinkers, if included, are typically added in a range of about 0.01 to about 0.5 percent by weight, preferably about 0.02 to about 0.1 percent by weight, most preferably about 0.03 to about 0.08 percent by weight, based upon the total weight of monomer included.

The potential uses for a pH neutral nonionic adhesive are numerous and varied. Such a neutral adhesive can be used for medical tapes and the like, where a patient may show sensitivity to other adhesives. Also, for controlled-release drug delivery devices, which may be applied to the skin for several days, the neutral adhesive of this invention may prove to be advantageous from a skin irritation standpoint as well as a drug non-interaction standpoint. Finally, it is well-known that photographs are sensitive to acids and bases, so that a neutral nonionic adhesive may prove advantageous for mounting and displaying photographs.

Emulsion Polymerization Method of the Present Invention

Another aspect of the present invention relates to a method of carrying out the emulsion polymerization of the monomers described above. The neutral nonionic latex of the invention can be prepared by combining a Solution I comprising: (1) about 5 to about 70 weight percent of a free radically polymerizable nonionic monomer charge wherein the monomer charge comprises: (i) about 90 to about 99 percent by weight of nonionic alkyl acrylate monomer; and (ii) about 1 to about 10 percent by weight of nonionic amide monomer; wherein the weight percentages of (i) and (ii) are based upon the total weight of (i) plus (ii); and (2) about 0.05 to about 0.25 weight percent of an oleophilic nonionic free radical initiator based upon the weight of the free radically polymerizable monomer charge wherein said nonionic-free radical initiator is capable of initiating free radical polymerization of the monomer upon being subjected to a means of initiation with a Solution II. Solution II comprises (1) about 30 to about 95 weight percent of an aqueous phase, based upon the weight of the neutral nonionic latex; and (2) about 2 to about 10 weight percent of a nonionic emulsifier having an HLB of about 8 to about 24 based upon the total weight of the free radically polymerizable monomer charge, the nonionic emulsifier, and the nonionic free radical initiator, in order to form a mixture. The mixture is homogenized in order to form an emulsion. Free-radical polymerization is initiated by subjecting the emulsion to a means of initiation while agitating the emulsion under inert atmospheric conditions. Free-radical polymerization is sustained until a latex is produced.

The monomers can be charged into a suitable vessel in any order and combined with the initiator in order to form a solution (Solution I). The remainder of the emulsion polymerization components including the aqueous phase (preferably deionized water), and the nonionic emulsifier, are typically mixed in a separate vessel in order to form an aqueous solution (Solution II). The aqueous phase (i.e. water) preferably comprises about 30 to 95 weight percent, most preferably about 50 to about 70 weight percent based upon the total weight of the neutral nonionic latex. The free radically polymerizable monomer/initiator solution (Solution I) is then typically added to the aqueous solution (Solution II) following which the resultant mixture is homogenized.

Homogenization can be accomplished using a conventional homogenizer such as a Waring TM blender (available from Dynamics Corporation of America), a Manton-Gaulin TM homogenizer (available from Gaulin Corporation), a Microfluidizer TM homogenizer (available from Microfluidics Corporation), a colloid mill, a Sonifier TM homogenizer (available from Bronson Ultrasonics Corporation), a rotor-stator type homogenizer, etc. The emulsion thus obtained is a stable emulsion containing droplets of monomer or monomer mixture having a diameter on the order of about 0.1 to about 0.9 micrometer dispersed within the aqueous phase.

The emulsion is typically charged into a suitable reactor. To avoid inhibition by oxygen, the reactor is typically purged with an inert gas such as nitrogen before and after the emulsion is charged into the reactor. A conventional polymerization reactor equipped with an agitator and a condenser can be used in order to carry out the emulsion polymerization. In the laboratory, bottles heated in a water bath with proper agitation can also be used for this purpose.

Polymerization is then initiated by subjecting the emulsion to a means of initiation, typically by the application of heat. A suitable polymerization temperature typically falls within the range of about 50° C. to about 90° C. depending upon the type of initiator system and monomer composition utilized. Polymerization times on the order of about 2 to about 20 hours are generally adequate, depending upon the initiator, monomer composition, and polymerization temperature utilized. The latex thus obtained comprises polymer particles having diameters on the order of about 0.1 to about 0.9 micrometer, stabilized by the emulsifier within the aqueous phase.

A typical process for producing the emulsion polymers of this invention is as follows. An aqueous solution of a nonionic emulsifier and water is prepared. The aqueous solution is mixed with a previously-prepared nonaqueous solution of free radically polymerizable monomer and a non-ionic oleophilic thermal free radical polymerization initiator under homogenization conditions for about one minute in order to prepare an oil-in-water emulsion. The resulting oil-in-water emulsion is heated to induction temperature and stirred under nitrogen until polymerization occurs, as signaled by a reaction exotherm. Stirring is continued, at an elevated temperature, for about two hours, after which the reaction vessel is cooled to room temperature and the polymeric product is recovered by filtration. If the resulting polymer is to be coated directly, any additives such as nutrients, growth inhibitors, etc., are added with stirring. Water is added or removed to reach an appropriate coating viscosity, and the mixture is coated onto an appropriate substrate. Typically, the adhesive particle diameter ranges from about 0.3 to about 0.8 micrometer and the filtered reaction mixture has a Brookfield viscosity of about 5 to about 15 cps. Typically the reaction mixture has a pH in the range of about 5 to about 9.

Additives

The latex prepared according to the method of the invention may be used alone as a PSA coating or alternatively it may be used in combination with one or more of the following additives:

Thickening agents such as nonionic polyurethanes (e.g. rheology modifier QR-708 available from Rohm and Haas Co.), dyes, pigments, microbial growth nutrients or inhibitors, etc.

Coated Sheet Materials

The latex of the present invention is typically best used as a coating for a solid substrate, which may be a sheet, a fiber, or a shaped object. Examples of suitable substrates include but are not limited to the following: polyesters, polyolefins, paper, metal foil, polyurethane, polyvinyl chloride, and other sheet or film materials.

The desired concentration of the latex coating depends upon the method of coating and upon the desired coating thickness. If necessary, a polymer latex of a higher percentage solids content obtained from the aforementioned emulsion polymerization process can be diluted with water to a lower concentration, e.g., about 2 to about 20 weight percent solids, preferably about 5 to about 20 weight percent solids in order to obtain a thinner coating of film.

The latex coating composition may be applied to a suitable substrate by means of conventional coating techniques such as wire-wound rod, direct gravure, offset gravure, reverse roll, air-knife, and trailing blade coating. The coating is typically dried at a temperature of at least about 65° C. in order to adequately dry the film and obtain a coating possessing good adhesive properties. The resultant adhesive coatings provide adhesives having the following typical peel adhesion and shear strength ranges (i.e. typically about 10 to about 50 N/dm; about 0.5 to about 10 minutes shear).

Example Test Methods

The test methods used to evaluate the PSA of the examples are industry standard tests. The performance of the latex of the invention as a PSA composition has been measured in tape form with the adhesives coated by standard methods onto conventional film backings. The standard tests are described in detail in various publications of the American Society for Testing and Materials (ASTM), Philadelphia, Pa., and the Pressure Sensitive Tape Council (PSTC), Glenview, Ill. The standard test methods are described in detail below. The reference source of each of the standard test methods is also given.

Shear Strength (Reference: ASTM: D3654-78; PSTC-7)

The shear strength is a measure of cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive coated strips applied to a stainless steel panel such that a 2.5 mm by 12.5 mm portion of each strip was in firm contact with the panel with one end portion of the tape being free. The panel with coated strip attached was held in a rack such that the panel forms and angle of 178° with the extended tape free end which is then tensioned by application of a force of one kilogram applied as hanging weight from the free end of the coated strip. The 178° angle (2° less than 180°) is used to negate any peel forces thus insuring that only the shear forces are measured in an attempt to more accurately determine the holding power of the tape being tested. The time elapsed for each tape example to separate from the test panel is recorded as the shear strength.

Peel Adhesion (Reference: ASTM D3330-78 PSTC-1 (11/75))

Peel adhesion is the force required to remove a coated flexible sheet material from a test panel measured at a specific angle and rate of removal. In the examples, this force is expressed in Newtons per dm (N/dm) width of coated sheet. The procedure followed is:

1. A 12.5 mm width of the coated sheet is applied to the horizontal surface of a clean glass test plate with at least 12.7 lineal cm in firm contact. A hard rubber roller is used to apply the strip.

2. The free end of the coated strip is doubled back nearly touching itself so the angle of removal will be 180°. The free end is attached to the adhesion tester scale.

3. The glass test plate is clamped in the jaws of a tensile testing machine which is capable of moving the plate away from the scale at a constant rate of 2.3 meters per minute.

4. The scale reading in Newtons is recorded as the tape is peeled from the glass surface. The data is reported as the range of numbers observed during the test.

Preparation of Samples for Shear Strength and Peel Adhesion Testing

The shear holding power and peel adhesion are relative values which are influenced by how the samples to be tested are prepared and how they are coated. All of the examples reported were prepared by coating the copolymer from the emulsion to a dried thickness of 25 micrometers on to a primed 37 micrometer thick polyester film. The tapes were conditioned for 12 hours in a constant temperature testing room at 22° C. and 50% relative humidity.

EXAMPLE 1

Separate mixtures of 68.80 g IGEPAL CA-897 nonionic surfactant available from RHÔNE-POULENC and 32.00 g N-vinylpyrrolidone (NVP) in 2400 g deionized (DI) water, and 2.40 g lauroyl peroxide in 1568.0 g isooctyl acrylate (IOA) were prepared, then mixed together in a Waring ™ blender and homogenized for one minute. The resulting homogenate was added to a nitrogen-purged 5-liter reaction flask equipped with a paddle stirrer, nitrogen purge, condenser, and heating mantle, after which it was stirred and heated to 60° C. The start of the reaction was signaled by an exotherm which was allowed to progress to a peak temperature of about 90° C. The reaction was allowed to cool to 70° C., and was held at the temperature, with stirring, for two hours. The resulting mixture had a solids content of about 40%. After cooling to room temperature, the reaction mixture was filtered through cheesecloth and the filtrate was coated onto a 37 mm polyester substrate.

Standard adhesive test results for the above product showed: 180° Peel Adhesion (2.3 meters/min, glass)=15.5–22.2 N/dm; and Shear (12.5 mm×12.5 mm−1 kg, stainless steel)=1.2 minutes (cohesive failure), and latex pH=7.2.

EXAMPLE 2

The procedure of Example 1 was followed except that acrylamide monomer was substituted for N-vinylpyrrolidone monomer.

Standard adhesive test results for the above product showed: 180° Peel Adhesion (2.3 meters/min., glass)=46.4 N/dm; Shear (12.5 mm×12.5 mm−1 kg, stainless steel)=15 minutes (cohesive failure), and latex pH=5.3.

The examples and the data contained herein demonstrate that the adhesive of the invention truly functions as an adhesive and that it is chemically neutral.

While this invention has been described in connection with specific embodiments, it should be understood that it is capable of further modification. The claims herein are intended to cover those variations which one skilled in the art would recognize as the chemical equivalent of what has been described here.

We claim:

1. A neutral nonionic latex comprising:
   (a) about 20 to about 60 weight percent of a nonionic polymer comprising polymerized free-radically polymerizable nonionic monomer, based upon the total weight of said neutral, nonionic latex, wherein the free-radically polymerizable nonionic monomer comprises:
      (i) about 90 to about 99 percent by weight of nonionic alkyl acrylate monomer; and
      (ii) about 1 to about 10 percent by weight of nonionic amide monomer; wherein the weight percentages of (i) and (ii) are based upon the total weight of (i) plus (ii);
   (b) about 30 to about 95 weight percent of an aqueous phase, based upon the total weight of said neutral nonionic latex; and
   (c) about 2 to about 10 weight percent of a nonionic emulsifier based upon the total weight of the nonionic polymer plus the nonionic emulsifier;
   wherein the total weight of (a) plus (b) plus (c) equals 100%,
   and further wherein particles of the nonionic polymer are stabilized by the nonionic emulsifier and dispersed within the aqueous phase.

2. The latex of claim 1 wherein said amide monomer is selected from the group consisting of acrylamide, methacrylamide, N-vinyl-pyrrolidone, N-vinylcaprolactam, N-vinyl-2-piperidinone, N-mono-$C_1$–$C_5$-alkyl acrylamides, N,N-di-$C_1$–$C_5$-alkyl acrylamides, N-mono-$C_1$–$C_5$-alkyl methacrylamides, N,N-di-$C_1$–$C_5$-alkyl methacrylamides, and mixtures thereof.

3. The latex of claim 1 wherein said alkyl acrylate monomer is a $C_2$ to $C_{10}$ ester of acrylic acid.

4. The latex of claim 1 wherein said alkyl acrylate monomer is selected from the group consisting of isooctyl acrylate, 2-ethylhexyl acrylate, butyl acrylate, ethyl acrylate, isoamyl acrylate, and mixtures thereof.

5. The latex of claim 1 wherein said nonionic emulsifier is selected from the group consisting of ethoxylated fatty alcohols, ethoxylated alkylphenols, ethoxylated fatty acids, ethoxylated fatty esters, sorbitan derivatives, sucrose esters and derivatives, ethylene oxide-propylene oxide block copolymers, fluorinated alkyl polyoxyethylene ethanols, and mixtures thereof.

6. The latex of claim 1 which further comprises about 0.01 to about 0.5 percent by weight of a crosslinking agent based upon the total weight of said free radically polymerizable nonionic monomer.

7. The latex of claim 1 wherein said alkyl acrylate is isooctyl acrylate and wherein said amide is selected from the group consisting of acrylamide, N-vinylpyrrolidone, and mixtures thereof.

8. A neutral nonionic latex comprising
   (a) about 30 to about 50 weight percent of a nonionic polymer comprising polymerized free-radically polymerizable nonionic monomer, based upon the total weight of said neutral, nonionic latex, wherein the free-radically polymerizable nonionic monomer comprises:
      (i) about 95 to about 98 percent by weight of nonionic alkyl acrylate monomer selected from the group consisting of isooctyl acrylate, 2-ethylhexyl acrylate, butyl acrylate, ethyl acrylate, isoamyl acrylate and mixtures thereof; and
      (ii) about 5 to about 2 percent by weight of nonionic amide monomer selected from the group consisting of acrylamide, methacrylamide, N-vinylpyrrolidone, N-vinylcaprolactam, N-vinyl-2-piperidinone, N-mono-$C_1$–$C_5$-alkyl acrylamides, N,N-di-$C_1$–$C_5$-alkyl methacrylamides, and mixtures thereof; wherein the weight percentages of (i) and (ii) are based upon the total weight of (i) plus (ii);
   (b) about 50 to about 70 weight percent of an aqueous phase, based upon the total weight of said neutral nonionic latex; and
   (c) about 3 to about 5 weight percent of a nonionic emulsifier selected from the group consisting of ethoxylated fatty alcohols, ethoxylated alkylphenols, ethoxylated fatty acids, ethoxylated fatty esters, sorbitan derivatives, sucrose esters and derivatives, ethylene oxide-propylene oxide block copolymers, fluorinated alkyl polyoxyethylene ethanols, and mixtures thereof based upon the total weight of the nonionic polymer plus the nonionic emulsifier;
   wherein the total weight of (a) plus (b) plus (c) equals 100%,
   and further wherein particles of the nonionic polymer are stabilized by the nonionic emulsifier and dispersed within the aqueous phase.

9. A neutral nonionic latex comprising:
   (a) about 30 to about 50 weight percent of a nonionic polymer comprising polymerized free-radically polymerizable nonionic monomer, based upon the total weight of said neutral, nonionic latex, wherein the free-radically polymerizable nonionic monomer comprises:
(i) about 95 to about 98 percent by weight of isooctyl acrylate monomer; and
(ii) about 5 to about 2 percent by weight of nonionic amide monomer selected from the group consisting of acrylamide, N-vinylpyrrolidone, and mixtures thereof; wherein the weight percentages of (i) and (ii) are based upon the total weight of (i) plus (ii);

(b) about 50 to about 70 weight percent of an aqueous phase, based upon the total weight of said neutral nonionic latex; and (c) about 3 to about 5 weight percent off a nonionic emulsifier selected from the group consisting of ethoxylated fatty alcohols, ethoxylated alkylphenols, ethoxylated fatty acids, ethoxylated fatty esters, sorbitan derivatives, sucrose esters and derivatives, ethylene oxide-propylene oxide block copolymers, fluorinated alkyl polyoxyethylene ethanols, and mixtures thereof based upon the total weight of the nonionic polymer plus the nonionic emulsifier;

wherein the total weight of (a) plus (b) plus (c) equals 100%, and further wherein particles of the nonionic polymer are stabilized by the nonionic emulsifier and dispersed within the aqueous phase.

10. An adhesive coating formed by coating and drying the latex of claim 1 on a substrate.

11. An adhesive coating formed by coating and drying the latex of claim 8 on a substrate.

12. An adhesive coating formed by coating and drying the latex of claim 9 on a substrate.

13. A coated sheet material comprising the adhesive coating of claim 12 coated on a substrate.

14. A coated sheet material comprising the adhesive coating of claim 10 coated on a substrate.

15. A coated sheet material comprising the adhesive coating of claim 11 coated on a substrate.

* * * * *